United States Patent [19]

Niederer

[11] 4,080,992

[45] Mar. 28, 1978

[54] THREE-POSITION, SELF-CENTERING VALVE FOR CONTROL OF FLUID ACTUATORS AND THE LIKE

[75] Inventor: Otto C. Niederer, Madison, Ohio

[73] Assignee: Design & Manufacturing Corporation, Willoughby, Ohio

[21] Appl. No.: 704,395

[22] Filed: Jul. 12, 1976

[51] Int. Cl.² ............................................. F16K 11/16
[52] U.S. Cl. ..................... 137/636; 91/465; 137/596; 137/625.69
[58] Field of Search .................. 91/323, 465, 469; 137/596, 625.67, 625.69, 636, 636.1, 636.2, 625.6, 596.14

[56] References Cited

U.S. PATENT DOCUMENTS

| | | | |
|---|---|---|---|
| 1,521,628 | 1/1925 | Jones | 137/596 |
| 2,936,001 | 5/1960 | Lull | 137/636 X |
| 3,149,537 | 9/1964 | Fink | 137/625.69 X |
| 3,279,748 | 10/1966 | Coulter | 137/625.69 X |
| 3,318,333 | 5/1967 | McCollum | 137/625.69 |
| 3,766,944 | 10/1973 | Distler | 137/625.6 |
| 3,939,757 | 2/1976 | Jablonsky | 137/636 |

Primary Examiner—Robert G. Nilson
Attorney, Agent, or Firm—Maky, Renner, Otto & Boisselle

[57] ABSTRACT

A pair of fluid valves are formed in a common valve body. Movable pistons in the respective valves are normally biased by the fluid pressure input to closed positions whereby button-like or rod-like extensions of the pistons protrude through a top wall of the valve body to urge a pivotal valve operator to a neutral centered position. By manually pivoting the operator against one or the other of the extensions the respective pistons may be moved to open the respective valves.

5 Claims, 3 Drawing Figures

THREE-POSITION, SELF-CENTERING VALVE FOR CONTROL OF FLUID ACTUATORS AND THE LIKE

BACKGROUND OF THE INVENTION

The present invention relates generally, as indicated, to a fluid flow controlling valve and, more particularly, is directed to a three-position, self-centering valve for controlling the delivery of fluid to and the venting of fluid from fluid actuators and the like.

One exemplary type of fluid actuator with which the valve of the invention may be utilized produces a linear mechanical displacement output upon actuation or energization in response to a fluid input, and that mechanical displacement output may be employed to do work on an external device. Such a fluid actuator, for example, includes a body or casing within which a variable volume chamber is formed on one side of a piston, and when fluid pressure in the chamber is increased by supplying fluid thereto to energize the actuator, increased force on the piston out-strokes or moves the same in the cacing to enlarge the chamber. A piston rod coupled to the piston moves therewith to provide the linear mechanical displacement output of the actuator. A return spring in the casing, for example, would normally urge the piston and piston rod toward de-energized instroked position to maintain a minimum volume of the chamber when fluid is vented therefrom in preparation for a subsequent energization of the actuator.

Moreover, a plurality of such fluid actuators may be employed in a mechanical system to provide selective actuation or operation of various portions of such system. For example, two fluid actuators may be positioned relative to a linkage to provide opposite operation of a switch, respectively. Energization of one of the fluid actuators, then, would cause closure of the switch and energization of the opposite fluid actuator would effect opening of the switch. Such a system is mentioned for exemplary purposes only, and it will be appreciated that the valve of the present invention, as is described in more detail below, may be used for selectively energizing and de-energizing or otherwise operating other fluid responsive actuators, systems, and the like.

SUMMARY OF THE INVENTION

The valve of the present invention includes a control member, which in a preferred form is a piston, that is movable within a chamber formed in a valve body. Connected to the chamber are a fluid inlet, which provides a fluid input from an external fluid supply at a pressure preferably above ambient, a fluid connection or outlet to an external fluid actuator for supplying actuating fluid thereto and for venting fluid therefrom, and a vent. The control member in the chamber has a surface exposed to the fluid pressure therein to produce a bias force that tends to urge the control member to a valve closed position cutting off any flow path between the fluid inlet and the fluid connection while at the same time opening a flow path between the fluid connection and the vent. A rod-like or button-like extension of the control member extends outwardly of the valve body. By manually pressing that extension, for example, to apply a valve operating force that overcomes the bias force, the control member is moved to a position in the chamber opening the valve and, thus, a flow path between the fluid inlet and the fluid connection while at the same time closing the flow path between the fluid connection and the vent; however, upon removal of that valve operating force, the bias force again moves the control member back to its normal valve closed position.

In one form of the ivention, a pair of movable control members are positioned for parallel movement in respective parallel-oriented chambers in a common valve body to which a common fluid inlet is provided. The fluid chambers have respective fluid connections to respective fluid actuators and respective vents. Equal bias forces on each of the control members normally urge the valves closed, and either of the control members may be individually moved in its respective chamber to energize respective fluid actuators, for example. In a preferred embodiment the extensions of each control member protrude from the valve body, when in closed positions, like maximum amounts, and a single common valve operator similar to a toggle-like mechanism is mounted in confronting relation to the extensions to be manually or otherwise pivotally moved in respective directions to open the valves, respectively. When the toggle-like mechanism is released, the bias forces on both valve control members move them and the toggle-like mechanism back to a central neutral position at which both valves are closed.

It will be appreciated that although the valve arrangement of the present invention will be described hereinafter with respect to a preferred embodiment employing a pair of valves in a common valve body, the valve of the invention may be singly used or used in combinations of more than simply one pair. Moreover, although the invention will be described hereinafter with reference to an open fluid system, for example, a pneumatic system wherein the vent simply discharges or dumps pneumatic pressure to the ambient environment, it will be understood that the invention may be employed in closed fluid systems, such as hydraulic fluid systems, wherein the vent would be coupled to a return fluid line leding, for example, to a fluid reservoir or the like.

With the foregoing in mind, it is a principal object of the invention to provide a fluid valve that is improved in the noted respects.

Another object is to control the flow of fluid to a fluid responsive device.

An additional object is to supply fluid to and to vent fluid from a fluid responsive device.

A further object is to close a valve automatically in response to fluid pressure therein.

Still another object is to center automatically a toggle or like common operator of a plurality fo fluid valves in response to fluid pressure in the valves.

Still an additional object is to provide for automatic self-centering and closing of a pair of fluid valves, thus providing one neutral, valves closed position thereof and two selectively actuated positions to open the valves, respectively, to supply fluid to respective fluid responsive devices or the like.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

DESCRIPTION OF THE PREFERRED EMBODIMENT

Figure 1:
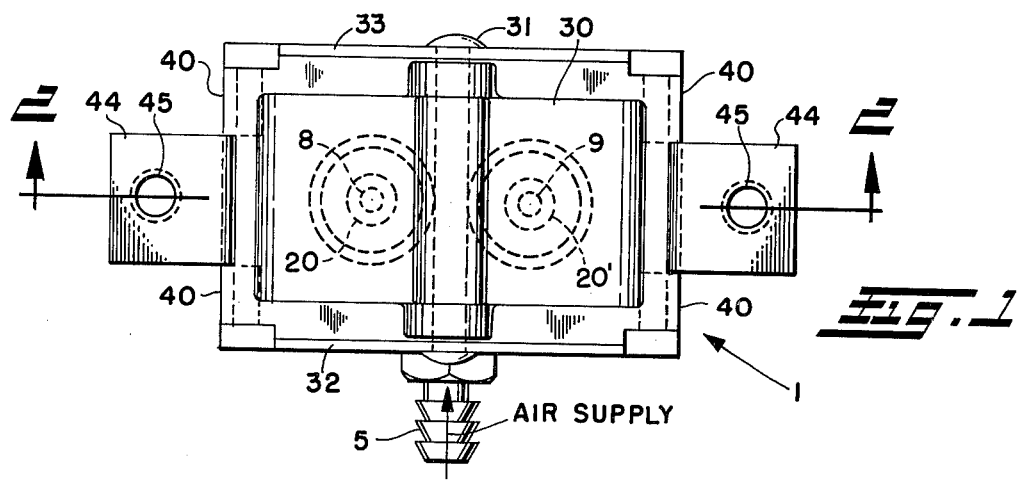
FIG. 1 is a top plan view of a three-position, self-centering valve in accordance with the invention illustrating in dotted outline the various circular diameters of the valve chambers in the valve body.
Figure 2:
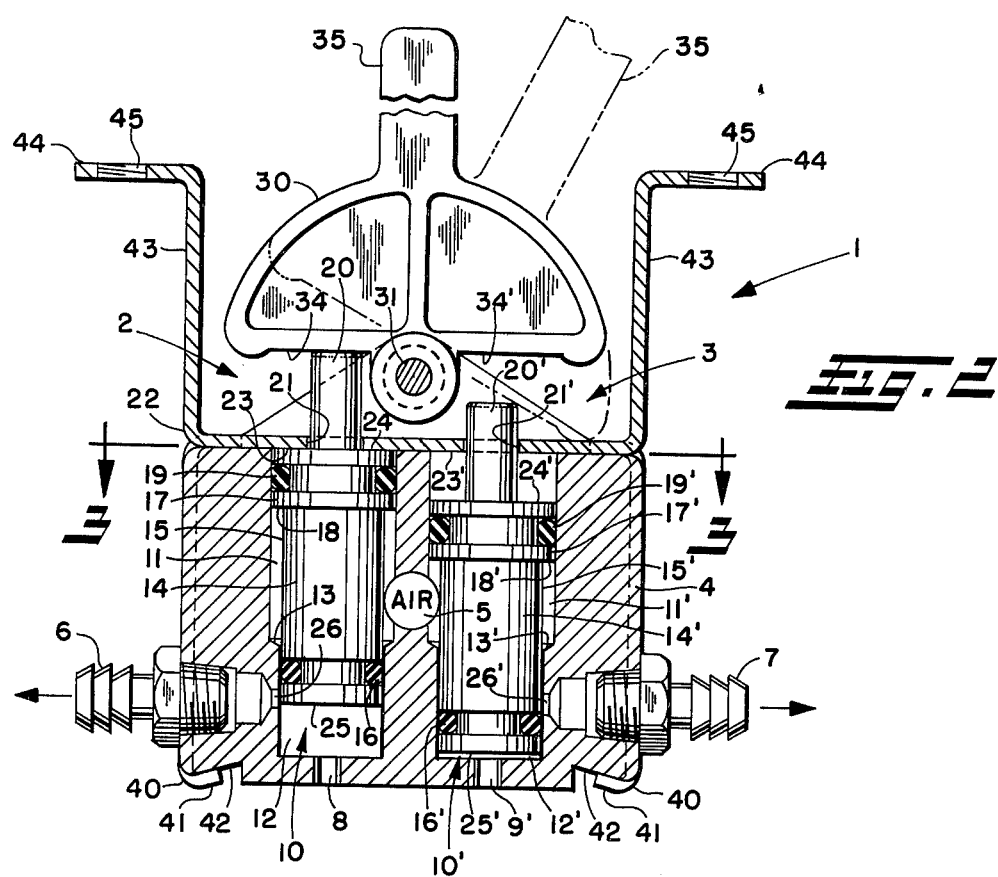
FIG. 2 is a section view, which is partly in elevation, of the valve of FIG. 1 looking generally in the direction of arrows 2—2 thereof.
Figure 3:
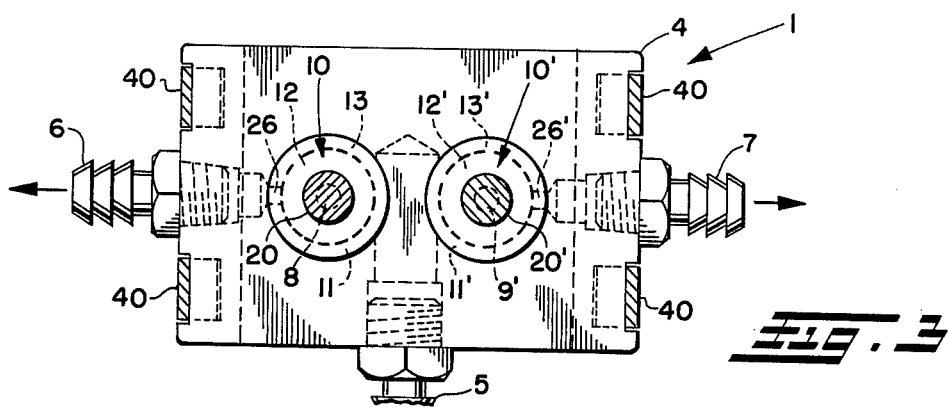
FIG. 3 is a top plan view, partly in section, of the valve body looking generally in the direction of the arrows 3—3 of FIG. 2.

Referring now more particularly to the drawing, wherein like reference numerals designate like parts in the several figures, a three-position, self-centering valve assembly in accordance with the invention is generally indicated at 1 in FIGS. 1, 2 and 3. The valve assembly 1 includes a pair of similarly formed fluid valves 2, 3 in a common valve body 4. Each of the fluid valves 2, 3 would normally be biased toward a closed condition, as is shown by the valve 2 in FIG. 2, in response to pneumatic pressure supplied at a common fluid inlet 5 from a pneumatic supply, not shown. In such closed condition of the valves, flow paths are completed between fluid connections or outlets 6, 7 for coupling the valves to respective external fluid actuators or the like and vents 8, 9 to vent fluid from the respective actuators in order to de-energize the same. On the other hand, each of the fluid valves 2, 3 may be individually operated to an open condition, as is shown by the fluid valve 3 in FIG. 2, whereby a flow path is provided between the fluid inlet 5 and a respective fluid connection 6, 7 while at the same time the respective vent is closed.

The fluid valve 2 includes a hollow, generally cylindrical, stepped chamber or bore 10, which has an upper relatively larger cross-sectional diameter portion 11, a lower smaller cross-sectional diameter portion 12, and a step 13 therebetween and a piston-like control member 14, referred to below as piston, that is slidable within the chamber 10. The piston 14 has a cylindrical portion 15 with a cross-sectional diameter slightly smaller than that of the lower chamber portion 12, and a conventional O-ring seal 16 near the lower end of the cylindrical portion 14 provides a fluid-tight seal with the wall of the lower chamber portion 12. Near the top of the cylindrical portion 15 of the piston 14 is an annular skirt 17 which provides a surface area 18 facing in a direction generally perpendicular to the longitudinal axis of the piston 14 and exposed to fluid pressure in the chamber 10. An additional O-ring type fluid seal 19 is formed in the skirt 17 above the surface area 18 to prevent fluid leakage from the chamber 10. A button-like or rod-like extension 20 of the piston 14 passes through an opening 21 in a plate-like mounting bracket 22, which covers the open top of the upper chamber portion 11 by a wall portion 23 that cooperates with a top surface of the piston to provide a stop therefor in order to limit the upward travel thereof.

Pneumatic pressure in the upper chamber portion 11 from the fluid inlet 5 normally acts on the surface area 18 of the piston 14 to provide a bias force to the latter biasing the same in an upward direction, as illustrated in FIG. 2, for example, with the wall portion 23 and the piston top surface in engagement. In this regard the skirt 17 and surface 18 act as a differential pressure responsive biasing mechansim in that the top wall of the skirt is exposed to ambient pressure through the opening 21 while the surface 18 is exposed to the relatively larger pressure in the chamber portion 11 tending to urge the piston upward since the wall of the chamber or bore 10 is stepped at 13 and the piston fits closely in the smaller chamber bore 12 so that there is no substantial downward biasing force on the piston.

In such biased position of the piston 14, the fluid valve 2 is closed, whereby the O-ring seal 16 blocks the flow of pneumatic fluid from the upper chamber portion 11 to the fluid connection 6. Moreover, in such closed position of the piston 14, the bottom surface 25 of the cylindrical portion 15 is raised above at least part of the port 26 leading to the fluid connection 6 and the external fluid actuator; therefore, a flow path is provided through the lower chamber portion 12 from the port 26 to the vent 8 in order to vent fluid from the fluid actuator de-energizing the same.

To open one of the fluid valves in the valve assembly 1 to the condition shown at the fluid valve 3, wherein primed reference numerals designate parts corresponding those of the fluid valve 2, the rod-like extension 20' is pushed downward with a force of a sufficient magnitude to overcome the bias force exerted on the surface area 18', whereupon the piston 14' moves downward in the chamber 10' a sufficient amount that the O-ring seal 16' is below the port 26'. The O-ring seal 16', therefore, blocks the flow path between the fluid connection 7, the port 26' and the vent 9, for example. Moreover, the pneumatic fluid from the fluid inlet 5 passes into the upper chamber portion 11' and downwardly through the clearance space between the cylindrical portion 15' of the piston 14' and the wall of the lower chamber portion 12' to the port 26' for delivery via the fluid connection 7 to another fluid actuator, not shown, in order to actuate or to energize the same. The additional O-ring seal 19' in the skirt 17' of the piston 14' prevents leakage of pneumatic fluid upwardly beyond the seal and through the opening 21' in the wall portion 23' of the mounting bracket 22 covering the opening of the upper chamber portion 11' in the valve body 4.

When the downward valve operating force is removed from the rod-like extension 20', the pneumatic pressure acting on the annular surface area 18' and providing the bias force on the piston 14' moves the latter to its closed position, as is shown, for example, in the fluid valve 2, whereby the top surface 24' of the piston 14' abuts the wall portion 23' of the mounting bracket.

In the preferred form of the invention, when one of the fluid valves is in an open condition, as is shown in fluid valve 3, the relatively close clearance space between the cylindrical portion 15' of the piston 14' and the cylindrical wall of the lower chamber portion 12' may provide a flow restriction in order to drop the fluid pressure between that in the upper chamber portion 11' and that delivered to the port 26'. Therefore, when the piston 14' is in its downward valve open position, there will still be a bias force exerted on the annular surface area 18' tending to urge the piston 14 to its upward closed position, even though fluid at the fluid connection 7 may be directly or indirectly, via the external fluid actuator, dumped to the ambient environment. Alternatively, if the fluid delivered to the fluid actuator were not lost from the latter, i.e. the fluid actuator has no leakage, then upon completion of outstroking or the like of the fluid actuator such that it can no longer contain any additional fluid, fluid pressure from the fluid inlet 5 may act on the annular surface area 18' to bias the piston 14' back toward its valve closed position; and this automatic valve closure may be effected without the need for the noted flow restriction.

Although each of the rod-like extensions 20, 20' may be manually pressed, for example, by the finger of a person desiring to close one of the fluid valves 2, 3, the preferred form of the valve assembly 1 in accordance with the invention employs a mechanical toggle-like operator 30 supported on the mounting bracket 22 in alignment with both rod-like extensions 20, 20'. The valve operator 30 is generally rotatably or pivotally mounted by and about a pin-like support 31, which is itself supported by upstanding front and rear walls 32, 33 of the mounting bracket 22, such that surfaces 34, 34' of the operator 30 are directly aligned in confronting relation with respective top surfaces of the rod-like extensions 20, 20'. The operator 30 also includes a lever-like handle 35 that may be easily moved, for example, by the fingers or hand of a person wishing to open one of the fluid valves 2, 3, say, for example, by pivoting the operator 30 in a clockwise direction to that shown in phantom in FIG. 2, whereby the surface 34' applies a downward operating force on the rodlike extension 20' to move the piston 14' downward in its chamber 10' to open the fluid valve 3, as described above.

When the valve operator 30 is released from its position shown in phantom in FIG. 2, the biasing force on the annular surface area 18' of the piston 14' urges the latter upward to close the fluid valve 3 while the rod-like extension 20' pushes against the surface 34' of the operator 30 to pivot the same back to the position shown in solid in FIG. 2, whereby the handle 35 again extends in a vertical direction. Thus, the valve operator 30 is automatically centered and closure of both fluid valves 2, 3 is assured. Moreover, the valve operator 30 is formed and mounted preferably in a manner such that the surfaces 34, 34' will just be in abutment with the respective rod-like extensions 20, 20' when the top surfaces of the pistons 14, 14' engage the respective wall portions 23, 23' of the mounting bracket 22, thereby providing a specific centered position of the operator without any wobble or the like about the axis of the pin-like support 31.

The mounting bracket 22 is coupled to the valve body 4 by downwardly extending legs 40 that are crimped at 41 to engagement with notches 42 in the lower surface of the valve body. The mounting bracket 22 also has a pair of upstanding arms 43 and flanges 44 with holes 45 in the latter for facilitating fastening of the valve assembly 1 to an external support, not shown, with the handle 35 of the operator 30 being accessible in or through such support for operation of the valve assembly 1.

In view of the foregoing, it should now be clear that the three-position, self-centering valve mechanism 1 provides for automatic self-centering to one position of the valve operator 30 while at the same time automatically closing the fluid valves 2, 3 thereof. Moreover, the valve operator 30 can be rotated or pivoted toward a clockwise or counterclockwise position, relative to the illustration of FIG. 2, to open either of the two fluid valves 2, 3 in the manner described above.

The embodiments of the invention in which an exclusive property or privilege is claimed are defined as follows:

1. A fluid valve assembly comprising a valve body, a first bore in said valve body, a second bore in said valve body coaxially communicating with and of smaller diameter than said first bore, a control member selectively slidable in said first and second bores between two positions, one end of said control member being slidably sealed to said first bore by outwardly extending first seal means including a piston plate, the other end of said control means being only slightly smaller in diameter than said second bore and being slidably sealed to said second bore by second seal means at least partially contained within a radially inwardly extending groove in said control member, fluid inlet means in said body communicating with said first bore, fluid outlet means in said second bore selectively to deliver fluid from said second bore to an external device for operation of the same, vent means in said second bore, and actuator means to drive the control member from the first to second position, the fluid admitted to said first bore normally exerting pressure against the piston plate to urge the control member to the first position in which the fluid outlet means and vent means are in fluid communication with one another but are isolated from the fluid inlet means by said second seal means, the fluid pressure on said piston plate being overcome when the control member is slid by the actuator means to the second position in which the fluid inlet means and outlet means are in communication with one another via the first bore and limited clearance between the control member and second bore, but are isolated from said vent means by said second seal means, the fluid pressure in the first bore because of the limited clearance being sufficient to return the control member to the first position when the actuator means is released.

2. A fluid valve assembly as set forth in claim 1, further comprising a wall means closing off the end of said first bore remote from said second bore, said wall means acting to limit the travel of said control member to the first position.

3. A fluid valve assembly as set forth in claim 2, wherein said wall means includes an aperture therein, and said actuator means includes a rod connected to said control member and extending therefrom through said aperture for external actuation.

4. A fluid valve assembly as set forth in claim 3, further comprising an additional fluid-valve means in said valve body similar to said first mentioned fluid valve means for distributing fluid to and venting fluid from a second external device to operate the same independently of said first mentioned valve means.

5. A fluid valve means as set forth in claim 4, wherein said actuator means further includes a pivotally mounted valve operator means selectively to engage one of said rods to move the control member associated therewith to said second position.

* * * * *